(12) United States Patent
Omura et al.

(10) Patent No.: US 12,683,061 B2
(45) Date of Patent: Jul. 14, 2026

(54) LAMINATED CORE

(71) Applicant: JFE STEEL CORPORATION, Tokyo (JP)

(72) Inventors: Takeshi Omura, Tokyo (JP); Yoshihisa Ichihara, Tokyo (JP); Souichiro Yoshizaki, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 0 days.

(21) Appl. No.: 18/710,408

(22) PCT Filed: Sep. 22, 2022

(86) PCT No.: PCT/JP2022/035416
§ 371 (c)(1),
(2) Date: May 15, 2024

(87) PCT Pub. No.: WO2023/112419
PCT Pub. Date: Jun. 22, 2023

(65) Prior Publication Data
US 2025/0014800 A1     Jan. 9, 2025

(30) Foreign Application Priority Data

Dec. 14, 2021     (JP) ................................. 2021-202285

(51) Int. Cl.
*H01F 27/245*     (2006.01)
*B32B 15/01*      (2006.01)
*H02K 1/02*       (2006.01)

(52) U.S. Cl.
CPC .......... *H01F 27/245* (2013.01); *B32B 15/011* (2013.01); *H02K 1/02* (2013.01);
(Continued)

(58) Field of Classification Search
None
See application file for complete search history.

(56) References Cited

U.S. PATENT DOCUMENTS

2017/0274432 A1*   9/2017   Okubo ..................... C22C 38/04
2017/0342519 A1*   11/2017  Uesaka ..................... H01F 3/02
(Continued)

FOREIGN PATENT DOCUMENTS

EP     3653758 A1     5/2020
EP     3902108 A1     10/2021
(Continued)

OTHER PUBLICATIONS

Dec. 20, 2022 International Search Report issued in International Patent Application No. PCT/JP2022/035416.
(Continued)

*Primary Examiner* — Seth Dumbris
(74) *Attorney, Agent, or Firm* — Oliff PLC

(57)     ABSTRACT
A laminated core includes a stack of pieces of an electrical steel sheet that have a predetermined shape resulting from processing and includes a butted portion at which portions of a processed surface of the electrical steel sheet are abutted against each other. In the electrical steel sheet, an area ratio of regions of the processed surface that have an arithmetic mean roughness Ra of 5 μm or less is 90% or greater based on a total area of the processed surface.

1 Claim, 3 Drawing Sheets

DEGRADATION-INHIBITING
EFFECT IS LARGE

AREA RATIO OF PORTIONS OF INSULATING
COATING PRESENT ON PROCESSED SURFACE (%)

◇—— AREA RATIO OF REGIONS HAVING Ra OF 5 μm OR LESS: 70% (BEVELING)

▲····· AREA RATIO OF REGIONS HAVING Ra OF 5 μm OR LESS: 98% (LASER PROCESSING)

○---- AREA RATIO OF REGIONS HAVING Ra OF 5 μm OR LESS: 70% (LASER PROCESSING)

(52) U.S. Cl.
CPC ....... *B32B 2255/06* (2013.01); *B32B 2255/26*
(2013.01); *B32B 2307/208* (2013.01)

(56) References Cited

U.S. PATENT DOCUMENTS

| | | |
|---|---|---|
| 2019/0090711 A1 | 3/2019 | Lee |
| 2020/0123626 A1* | 4/2020 | Takebayashi ........ C21D 8/1222 |

FOREIGN PATENT DOCUMENTS

| | | |
|---|---|---|
| EP | 3913074 A1 | 11/2021 |
| JP | H07-298570 A | 11/1995 |
| JP | 2011-217565 A | 10/2011 |
| JP | 2014-086597 A | 5/2014 |
| JP | 2018-062682 A | 4/2018 |
| JP | 2019-176560 A | 10/2019 |
| KR | 102021833 B1 | 9/2019 |

| | | |
|---|---|---|
| KR | 102109279 B1 | 5/2020 |
| KR | 20210083313 A | 7/2021 |
| WO | 2018/012599 A1 | 1/2018 |

OTHER PUBLICATIONS

Aug. 14, 2025 Office Action issued in Korean Patent Application No. 10-2024-7016341 (with concise explanation in English).
Nov. 26, 2024 Extended Search Report issued in European Patent Application No. 22906954.7.
Oct. 10, 2023 Office Action issued in Japanese Patent Application No. 2023-501048 (with concise explanation in English).
Feb. 20, 2024 Office Action issued in Japanese Patent Application No. 2023-501048 (with concise explanation in English).
Jun. 11, 2025 Office Action issued in Canadian Patent Application No. 3,235,960.
Jan. 26, 2026 Office Action issued in Canadian Patent Application No. 3235960.
Mar. 28, 2026 Office Action issued in Korean Patent Application No. 2024-7016341 (concise explanation in English attached).

* cited by examiner

LAMINATED CORE

TECHNICAL FIELD

This application relates to a laminated core and, in particular, to a core for a transformer or a rotary machine that is produced by stacking pieces of an electrical steel sheet and in which a butted portion is present.

BACKGROUND

Cores for a transformer or a rotary machine are produced by processing an electrical steel sheet into pieces having a predetermined shape and subsequently stacking the pieces. Methods for the processing for providing pieces having a predetermined shape include punching, which is typically used in rotary machine applications, and beveling, which is typically used in transformer applications. In instances where a transformer or a rotary machine is produced with a laminated core produced by punching or beveling, a problem arises in that a variation in iron loss is large.

Techniques for reducing the variation in iron loss are disclosed in, for example, Patent Literature 1 to 3. Patent Literature 1 cites and focuses on strain that is introduced during processing, as being a possible cause of the variation in iron loss, and, accordingly, proposes a method that relieves plastic strain by annealing the workpiece after punching. Similar to Patent Literature 1, Patent Literature 2 also focuses on the strain and proposes a method that relieves the strain by shaving. Patent Literature 3 focuses on lamination accuracy and discloses a technique for controlling a shape of a steel sheet resulting from beveling; the shape is controlled to fall within a predetermined range to reduce a variation in the lamination accuracy, and as a result, a void in a joint of the steel sheet decreases in size, which leads to improvement in a transformer core in terms of iron loss, an excitation current, and noise.

CITATION LIST

Patent Literature

PTL 1: Japanese Unexamined Patent Application Publication No. 7-298570
PTL 2: Japanese Unexamined Patent Application Publication No. 2011-217565
PTL 3: Japanese Unexamined Patent Application Publication No. 2014-86597

SUMMARY

Technical Problem

Using any of the above-described techniques can improve the iron loss properties of laminated cores to some extent. However, there is still a need for further improvement in the properties.

The disclosed embodiments have been made in view of the above-described circumstances, and an object of the disclosed embodiments is to provide a laminated core having good iron loss properties.

Solution to Problem

The present inventors closely analyzed a laminated core having an iron loss much greater than a designed value and, consequently, found that a butted portion (joint) of the electrical steel sheet that served as the material of the core that constituted the laminated core had a very high magnetic reluctance, and, therefore, was in a state that made it very difficult for magnetic flux to flow therethrough. The present inventors conducted a further investigation and found that an arithmetic mean roughness Ra of a processed surface of the electrical steel sheet significantly affected the magnetic reluctance and that it is very important to reduce the surface roughness of the processed surface, thereby reducing a size of a void that is formed in the joint. Furthermore, the present inventors newly found that in instances where the size of the void formed in the joint (void fraction in the joint surface) is reduced, another factor that affects the flow of the magnetic flux is portions of an insulating coating that are present on the processed surface of the electrical steel sheet.

The disclosed embodiments were made based on the above-described findings. Specifically, primary features of the disclosed embodiments are as follows.

[1] A laminated core including a stack of pieces of an electrical steel sheet that have a predetermined shape resulting from processing; and a butted portion at which portions of a processed surface of the electrical steel sheet are abutted against each other, wherein, in the electrical steel sheet, an area ratio of regions of the processed surface that have an arithmetic mean roughness Ra of 5 μm or less is 90% or greater based on a total area of the processed surface.

[2] The laminated core according to [1], wherein the electrical steel sheet includes an insulating coating on a surface, and an area ratio of portions of the insulating coating that are present on the processed surface is 30% or less based on the total area of the processed surface.

Advantageous Effects

The disclosed embodiments can provide a laminated core having good iron loss properties. The disclosed embodiments can significantly improve the iron loss properties of cores for rotary machines or transformers.

DETAILED DESCRIPTION

Figure 1:
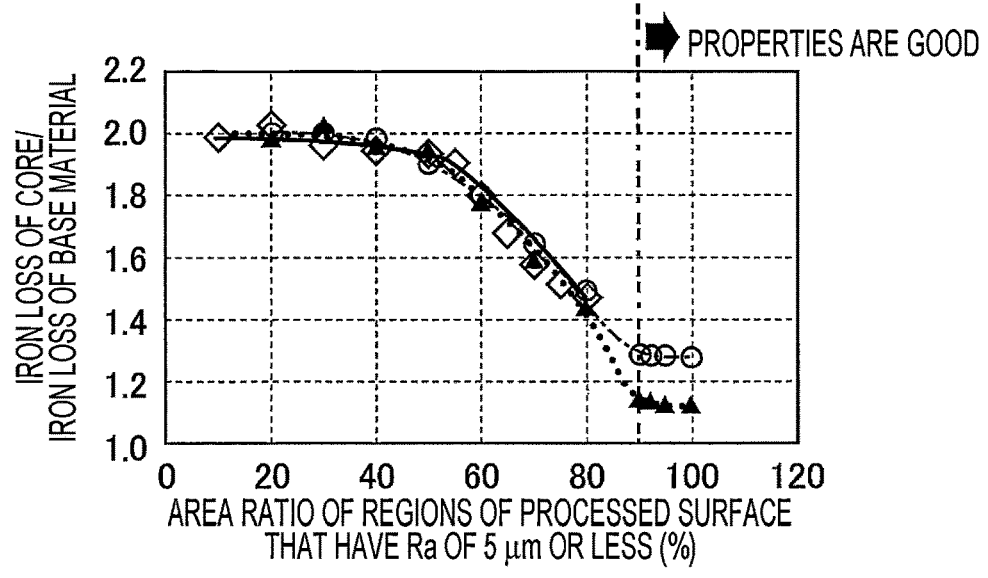
FIG. 1 is a graph showing a relationship between [iron loss of core/iron loss of base material] and an area ratio (%) of regions of a processed surface of a material of a core that have an arithmetic mean roughness Ra of 5 μm or less.

The disclosed embodiments will be described in detail below.

The first key to the disclosed embodiments is to reduce an arithmetic mean roughness of a processed surface of an electrical steel sheet that serves as a material of a core that constitutes a laminated core; the arithmetic mean roughness is a major factor responsible for degradation of iron loss properties. In instances where processing that uses a blade, such as punching or beveling, which is a common processing method, is employed, the resulting processed surface includes a shear surface and a fracture surface. Since the fracture surface has a high surface roughness, it is very important to improve the surface properties of the fracture surface. On the other hand, the shear surface has relatively good surface properties and has not attracted much attention so far; however, it was found that improving the surface properties of the shear surface is also very important. Controlling the arithmetic mean roughness of the processed surface including the shear surface reduces a size of a void in a butted portion (joint) in the core, the void being a void that is formed when the core is constructed by abutting portions of the processed surface of the electrical steel sheet against each other. Consequently, magnetic reluctance is reduced, and, therefore, the transfer of magnetic flux is facilitated, which leads to inhibition of loss (iron loss).

The shear surface has small scratches formed in a shear direction, which result from abrasion of the material (workpiece) caused by a flaw formed in or near an edge of the blade or by molten metal or the like present at or near the edge of the blade. The scratches increase the surface roughness. The small scratches can be reduced to some extent by sharpening the shape of the blade, strictly selecting a lubricant and the like, and selecting processing conditions under which a molten material is unlikely to become deposited at or near the edge of the blade. However, the shape of the edge of the blade becomes dull as the blade is continuously used, and further, it is difficult to completely prevent the deposition of a molten material or the like at or near the edge of the blade no matter how strictly the conditions are selected; therefore, processing methods that use a blade, such as shearing, punching, and beveling, presents a problem of stability.

Accordingly, it is preferable to select a method that is not processing that uses a blade. A specific example of the method is a processing method that utilizes a shock wave. Generating a shock wave requires forming a plasma on the surface of the steel sheet that serves as the workpiece to which the processing is applied. For this reason, in an instance where the processing is performed with a continuous (continuous wave) laser or a pulsed laser having a pulse width of a nanosecond or more, the laser beam is to be applied to the workpiece (steel sheet) in water or in a state in which a water film is present on the surface of the steel sheet. Consequently, the water inhibits the expansion of the plasma, thereby enabling the generation of a shock wave. It is preferable that the method just described or the like be used for the processing; however, the method is not the only possible method, and it is possible to employ a method in which, for example, the processing that uses a blade is controlled frequently and with high precision.

Processing was performed in which a continuous laser beam was applied in water to an electrical steel sheet that served as the workpiece, to generate a shock wave to provide pieces of the electrical steel sheet (material of the core) having a predetermined shape. Then, a three-phase three-legged laminated core formed of a yoke and legs was produced, and an iron loss property of the core was evaluated. As used herein, the expression "processing to provide pieces having a predetermined shape" means that the electrical steel sheet that serves as the workpiece is processed into pieces having a shape that conforms to the shape of the core that is to be produced. For the processing of the electrical steel sheet, which served as the workpiece, into pieces having a predetermined shape, a laser output and a beam diameter of the laser were varied to vary the intensity of the shock wave to form different properties of the processed surface. For comparison, beveling, which is a conventional method that uses a blade, was also performed to process an electrical steel sheet into pieces having a predetermined shape.

The iron loss of laminated cores produced from the respective processed electrical steel sheets was measured, and the iron loss (iron loss of the base materials) of the electrical steel sheets that served as the materials of the cores was also measured. Then, the ratio between them (iron loss of core/iron loss of base material) was determined. Furthermore, the arithmetic mean roughness Ra of the processed surfaces of the electrical steel sheets that served as the materials of the cores was measured, and an area ratio (%) of regions having an arithmetic mean roughness Ra of 5 μm or less based on the total area of the processed surface was determined.

FIG. 1 shows a relationship between [iron loss of core/iron loss of base material], determined as described above, and the area ratio (%) of regions having an arithmetic mean roughness Ra of 5 μm or less based on the total area of the processed surface of the electrical steel sheet used as the material of the core. The area ratio of regions of the processed surface that have a surface roughness (an arithmetic mean roughness Ra) of 5 μm or less was derived as follows. First, 50 sites of the processed surface were observed with a laser microscope, with one field of view having dimensions of a thickness of the steel sheet×300 μm. Then, each of the observed surfaces was equally divided into five in the thickness direction and five in a direction perpendicular to the thickness direction. The surface roughness (arithmetic mean roughness Ra) of each of the divided regions was measured. The total 1250 regions were measured to determine their arithmetic mean roughness. Among them, the number of regions having an arithmetic mean roughness of 5 μm or less was then determined and divided by 1250. The result was designated as the area ratio of regions of the processed surface that have an arithmetic mean roughness Ra of 5 μm or less. That is, the "area ratio (%) of regions of the processed surface that have an arithmetic mean roughness Ra of 5 μm or less" was calculated according to [number of regions having an arithmetic mean roughness Ra of 5 μm or less of all the observed regions (1250 sites)/number of all the observed regions (1250)]× 100. In the disclosed embodiments, the arithmetic mean roughness Ra is a value measured in accordance with JIS B 0601:2001. The area ratio of regions (areas) having an arithmetic mean roughness Ra of 5 μm or less of all the measured regions (areas) of the processed surface was used as an evaluation parameter.

The results are shown in FIG. 1. As shown in FIG. 1, it was found that, in the case of laser processing, when the area ratio of regions of the processed surface that have an arithmetic mean roughness Ra of 5 μm or less was 90% or greater, the ratio of an increase in the iron loss of the laminated core with respect to the iron loss (iron loss of the base material) of the electrical steel sheet that served as the material of the core was reduced. In the case of beveling, which was performed for comparison, controlling the properties of the shear surface was difficult in this instance, although attempts were made under various conditions, and, consequently, it was impossible to obtain an electrical steel sheet (material of the core) in which the area ratio of regions of the processed surface that have an arithmetic mean roughness Ra of 5 μm or less was 90% or greater.

Another finding was as follows. In an instance where an electrical steel sheet in which the area ratio of regions of the processed surface that have an arithmetic mean roughness Ra of 5 μm or less was 90% or greater based on a total area of the processed surface was used as the material of the core, the increase in the iron loss of the laminated core with respect to the iron loss of the base material varied in an instance in which the beam diameter of the laser used for the processing was varied. An investigation was conducted to identify the cause of this, and, consequently, it was found that there were variations in the degree of presence of components of an insulating coating on the processed surface. The degree of presence of components of an insulating coating on the processed surface was determined by performing analysis with an electron probe micro-analyzer (EPMA). Specifically, EPMA analysis was performed on the samples on which the laser microscope observation had been performed, regarding the same fields of view (50 sites, with one field of view having dimensions of the thickness of the steel sheet×300 μm). Thus, two-dimensional mapping images of elements that were not present in the steel substrate and were present only in the components of the insulating coating were acquired by image analysis. In the acquired two-dimensional mapping images, the regions having the elements that were not present in the steel substrate and were present only in the components of the insulating coating were considered to be areas in which portions of the insulating coating were present. A proportion of the areas in which portions of the insulating coating were present, based on the total area of the observation fields of view, was determined, and the result was designated as an area ratio (%), based on the total area of the processed surface, of portions of the insulating coating that were present. Consequently, it was found that in the case of the laser processing with a beam diameter of 200 μm, the areas in which components of the insulating coating were present accounted for 45% of the total area of the processed surface, whereas, in the case of the laser processing with a beam diameter of 80 μm, the areas in which components of the insulating coating were present accounted for 15% of the total area of the processed surface.

A reason that the portions of the insulating coating were caused to be present on the processed surface is believed to be as follows. During the processing of the steel sheet into pieces having a predetermined shape, hitting of a shock wave on the steel sheet causes a compressive stress to be generated in the hit portion, and as a result, a tensile stress is generated in a region around the portion. Presumably, the tensile stress causes portions of the insulating coating to be drawn toward the portion being processed and eventually delaminated to become present on the processed surface. Presumably, a reason that the degree of presence of the insulating coating on the processed surface varies with various beam diameters of the laser is that larger beam diameters result in larger laser irradiation areas, which in turn result in larger proportions of the insulating coating that are affected by the laser processing.

The second key to the disclosed embodiments is the inhibition of the presence of the insulating coating on the processed surface, as described above. Pieces of an electrical steel sheet (material of the core) having different proportions of the insulating coating present on the processed surface were manufactured as follows. Processing that used a shock wave was performed with a microsecond pulsed laser having a pulse width of microseconds, in a state in which water was present on the surface, with the beam diameter of the laser being varied. For comparison, pieces of an electrical steel sheet (material of the core) having different proportions of the insulating coating present on the processed surface were manufactured by performing beveling under various conditions with various clearances. Furthermore, with the laser processing, pieces of an electrical steel sheet (material of the core) having different respective area ratios of regions of the processed surface that have an arithmetic mean roughness Ra of 5 μm or less were manufactured by varying the laser output, with one of the ratios being within the range of the disclosed embodiments and the other being outside the range. In parallel, the iron loss of the manufactured electrical steel sheet (material of the core) was measured. Furthermore, a three-phase three-legged laminated core formed of a yoke and legs was produced with the manufactured pieces of the electrical steel sheet (material of the core), and the iron loss property of the core was evaluated.

Figure 2:
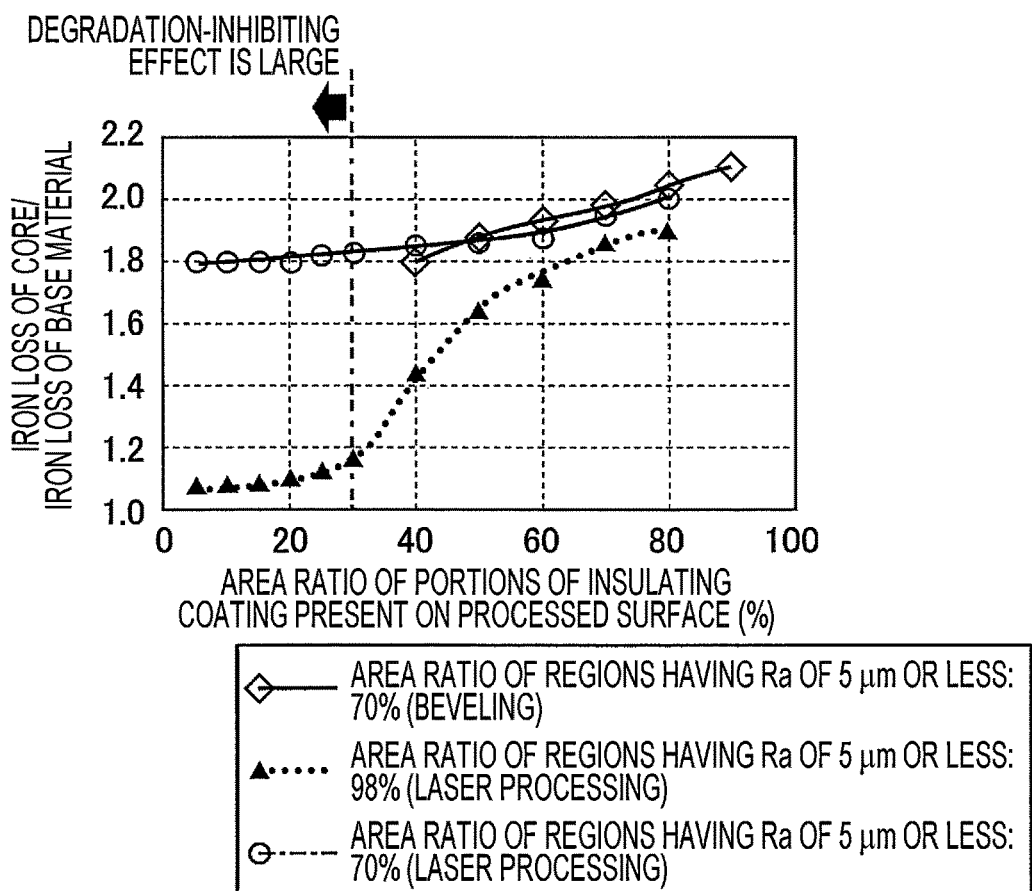
FIG. 2 is a graph showing a relationship between [iron loss of core/iron loss of base material] and an area ratio (%) of portions of an insulating coating that are present on the processed surface of the material of a core.
Figure 3:
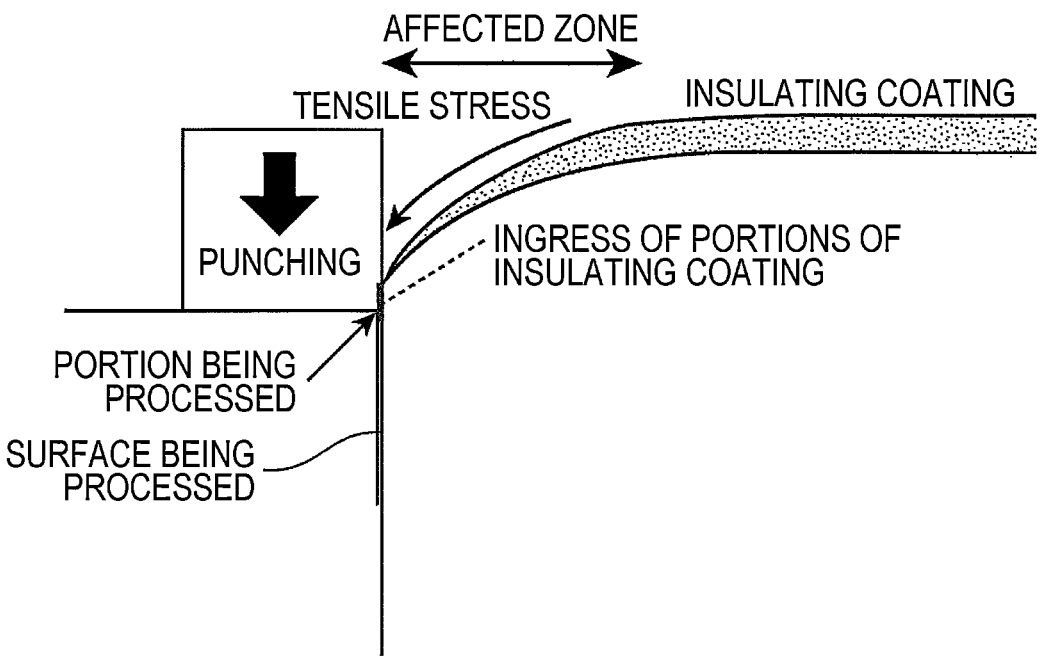
FIG. 3 is an illustration (schematic diagram) of a mechanism that causes portions of an insulating coating to be present on the processed surface of the material of a core.

The results are shown in FIG. 2. As shown in FIG. 2, when the area ratio of regions of the processed surface that have an arithmetic mean roughness Ra of 5 μm or less is within the range of the disclosed embodiments, the effect of inhibiting degradation of the iron loss property can be observed regardless of the proportion of the insulating coating present (area ratio of the insulating coating present) on the processed surface. Furthermore, it was found that when the proportion of the insulating coating present on the processed surface is 30% or less, the effect of inhibiting degradation of the iron loss property can be at the highest level. In the case of the electrical steel sheet (material of the core) produced by beveling for comparison, it was impossible to reduce the area ratio of the insulating coating present on the processed surface to 30% or less. Presumably, this is due to the following reason: the drawing of the insulating coating toward the portion being processed, which occurs also in the processing that uses a blade, affected a larger area than in the laser processing, and, consequently, a larger proportion of the insulating coating entered the portion being processed (FIG. 3).

Now, a laminated core of the disclosed embodiments will be described in detail.

Figure 4:
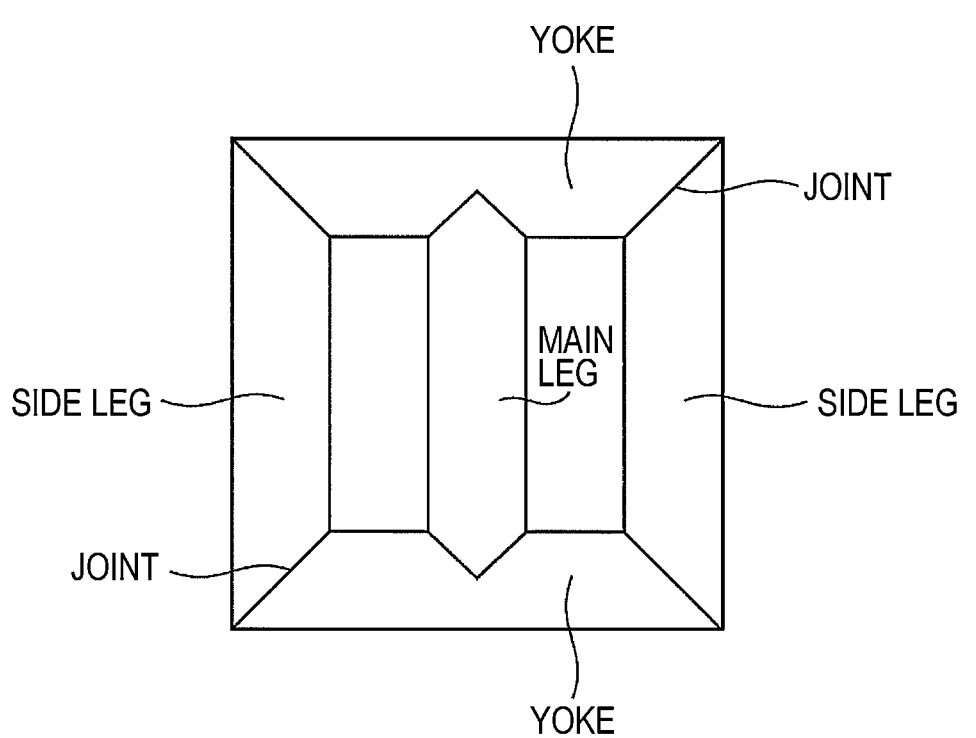
FIG. 4 is a schematic diagram of an example of a laminated core (core for a transformer) having a butted portion of a material of a core.
Figure 5:
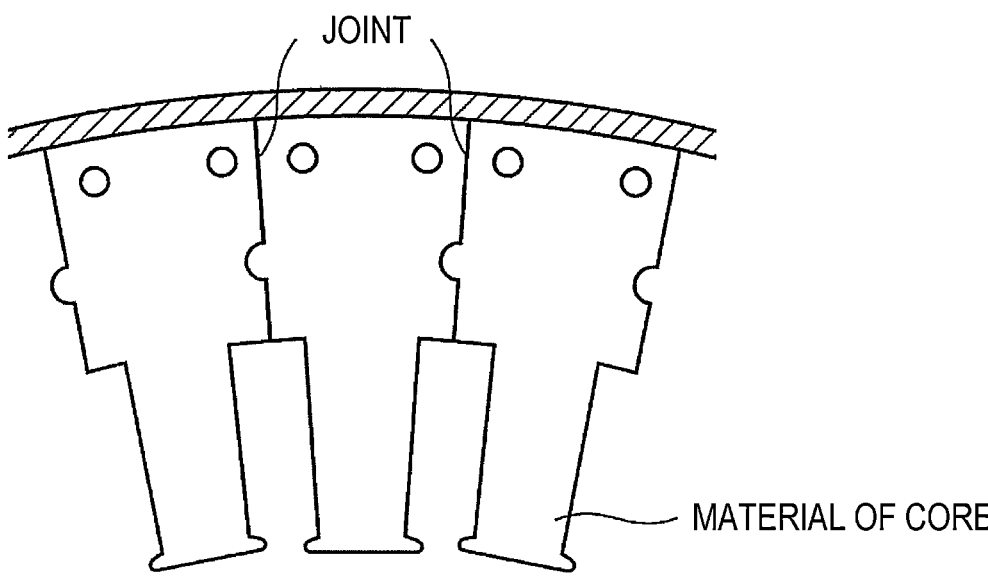
FIG. 5 is a schematic diagram of an example of a laminated core (core for a rotary machine) having a butted portion of a material of a core.

The laminated core of the disclosed embodiments is formed by stacking pieces of an electrical steel sheet, and the core includes a butted portion (joint) of the material of the core. Examples of such laminated cores include cores for a transformer, such as a core formed of a yoke and legs (FIG. 4) as disclosed in Japanese Unexamined Patent Application Publication No. 2014-86597. Furthermore, examples include cores for a rotary machine, such as a rotor and a stator of a split core type (FIG. 5) as disclosed in Japanese Unexamined Patent Application Publication No. 2019-201460.

Regarding the processed surface of the material of the core, when the area ratio of regions of the processed surface that have a surface roughness (an arithmetic mean roughness Ra) of 5 μm or less is less than 90%, the resulting laminated core has a large void in the joint, and as a result, the flow of magnetic flux through the joint is impeded, which increases the loss (iron loss) of the laminated core. Accordingly, in the disclosed embodiments, it is important to ensure that the area ratio of regions of the processed surface of the material of the core that have an arithmetic mean roughness Ra of 5 μm or less is 90% or greater, or more preferably 95% or greater, based on the total area of the processed surface. The area ratio of the regions may be 100% based on the total area of the processed surface. This requirement is difficult to satisfy when an improvement is made only to the fracture surface resulting from beveling or punching, which is a commonly employed method. It is important to additionally improve the condition of the shear surface, which is generally considered to have good surface properties.

Furthermore, in instances where the material of the core has an insulating coating on the surface, when the area ratio of portions of the insulating coating that are present on the processed surface is greater than 30%, the flow of magnetic flux is impeded in the regions in which the insulating coating is present, and, consequently, the loss (iron loss) increases. Accordingly, it is preferable that the area ratio of the insulating coating present on the processed surface be 30% or less based on the total area of the processed surface. The area ratio of the insulating coating present is more preferably 20% or less. The lower limit of the area ratio of the insulating coating present is not particularly restricted and may be 0%. When the area ratio of regions of the processed surface that have an arithmetic mean roughness Ra of 5 μm or less is within the range of the disclosed embodiments, the resulting laminated core has better iron loss properties than in instances in which the area ratio of the regions is outside the range of the disclosed embodiments. This is true even when the area ratio of the insulating coating present on the processed surface is greater than 30%, and the transfer of magnetic flux is thus made difficult, because the surface roughness of the processed surface has a greater influence. Better properties are achieved when the area ratio of regions of the processed surface that have an arithmetic mean roughness Ra of 5 μm or less is 90% or greater based on the total area of the processed surface, and the area ratio of the insulating coating present on the processed surface is 30% or less. Best properties are achieved when the area ratio of regions of the processed surface that have an arithmetic mean roughness Ra of 5 μm or less is 95% or greater based on the total area of the processed surface, and the area ratio of the insulating coating present on the processed surface is 30% or less.

The electrical steel sheet used in the disclosed embodiments may either be a grain-oriented electrical steel sheet or a non-oriented electrical steel sheet. Typically, a non-oriented electrical steel sheet is used for cores for a rotary machine, and a grain-oriented electrical steel sheet is used for cores for a transformer; however, there are exceptions, and, therefore, there are no limitations regarding which of the electrical steel sheets should be used.

There are also no particular limitations regarding a composition of the electrical steel sheet. For example, a composition known in the art may be employed. Preferred compositional ranges of the grain-oriented electrical steel sheet will be described below.

Si: 2.0 to 8.0 Mass %

Si is an element effective for increasing the electrical resistance of the steel, thereby reducing iron loss. When a Si content is 2.0 mass % or greater, the effect of reducing iron loss is sufficiently increased. On the other hand, when the Si content is greater than 8.0 mass %, workability is significantly reduced, and a magnetic flux density also tends to be reduced. Accordingly, it is preferable that the Si content be within a range of 2.0 to 8.0 mass %.

Mn: 0.005 to 1.0 Mass %

Mn is an element necessary for improving hot workability. When a Mn content is less than 0.005 mass %, an effect of the addition is not sufficiently produced. On the other hand, when the Mn content is greater than 1.0 mass %, the magnetic flux density tends to be reduced. Accordingly, it is preferable that the Mn content be within a range of 0.005 to 1.0 mass %.

At Least One Selected from Ni: 0.03 to 1.50 mass %, Sn: 0.01 to 1.50 mass %, Sb: 0.005 to 1.50 mass %, Cu: 0.03 to 3.0 mass %, P: 0.03 to 0.50 mass %, Mo: 0.005 to 0.10 mass %, and Cr: 0.03 to 1.50 mass %.

Ni is an element useful for improving a microstructure of a hot rolled steel sheet, thereby improving the magnetic properties. When a Ni content is less than 0.03 mass %, however, the effect of improving the magnetic properties is not significantly produced. On the other hand, when the Ni content is greater than 1.50 mass %, secondary recrystallization may be unstable, which tends to degrade the magnetic properties. Accordingly, in instances where Ni is included, it is preferable that the Ni content be within a range of 0.03 to 1.50 mass %.

Furthermore, Sn, Sb, Cu, P, Mo, and Cr are elements useful for improving the magnetic properties. For all of these elements, when the content is less than the above-described lower limit of the component, the effect of improving the magnetic properties is not significantly produced; on the other hand, when the content is greater than the above-described upper limit of the component, the growth of the secondary recrystallization grains is impaired. Accordingly, for all of these elements, the above-described content ranges are preferable when the elements are included.

Preferably, the balance is Fe and incidental impurities. Preferably, components other than the components described above are present in as small an amount as possible.

Now, preferred compositional ranges of the non-oriented electrical steel sheet will be described.

Si, Al, Mn, and P may be included. In this case, electrical resistance can be increased, and, consequently, a further reduction in iron loss can be achieved without compromising the spirit of the disclosed embodiments. It is preferable that Si be present in an amount of 0.5 mass % or greater, Al in an amount of 0.1 mass % or greater, Mn in an amount of 0.05 mass % or greater, and P in an amount of 0.01 mass % or greater, so that the effect of reducing iron loss can be produced to a greater degree. On the other hand, adding these elements in large amounts degrades workability, and, accordingly, the upper limits of the contents of these elements preferably are Si: 6.5 mass %, Al: 3.0 mass %, Mn: 3.0 mass %, and P: 0.5 mass %. Note that the effects of the disclosed embodiments can be sufficiently produced even when these elements are not added, and, therefore, the contents may be Si: less than 0.5 mass %, Al: less than 0.1 mass %, Mn: less than 0.05 mass, and P: less than 0.01 mass %.

Furthermore, in addition to the components described above, Sb, Sn, and Cr, which are known as elements that improve magnetic properties, may be added alone or in a combination of two or more. Contents of these elements preferably are Sn: 0.5 mass % or less, Sb: 0.5 mass % or less, and Cr: 5.0 mass % or less. A reason for the preference is that the effect of improving magnetic properties no longer increases even when the elements are added in amounts greater than the mentioned content ranges, and that, therefore, an effective effect of improving magnetic properties cannot be expected to be achieved, that is, it is impossible to produce a magnetic-properties-improving effect that is commensurate with the increase in alloying cost.

Preferably, the balance is Fe and incidental impurities. Preferably, components other than the components described above are present in as small an amount as possible.

Preferably, the electrical steel sheet used in the disclosed embodiments includes an insulating coating on a surface (top and bottom sides). The insulating coating is not particularly limited for either the grain-oriented electrical steel sheet or the non-oriented electrical steel sheet and may be, for example, an insulating coating known in the art.

An example of an insulating coating for the grain-oriented electrical steel sheet is a coating made up of a forsterite coating and a tension coating. The forsterite coating may primarily include MgO, and the tension coating may include, as a major component, magnesium phosphate or aluminum phosphate. Another example is a ceramic coating made of a nitride, a carbide, or a carbonitride, which may be formed by physical vapor deposition or chemical vapor deposition.

An example of an insulating coating formed on the surface of the non-oriented electrical steel sheet is a composite insulating coating primarily made of an inorganic material and further including an organic material. For example, the composite insulating coating is an insulating coating in which at least one inorganic material is present as a major component, and a particulate organic resin is dispersed. Examples of the inorganic material include metal salts, such as metal chromate salts and metal phosphate salts; colloidal silica; Zr compounds; and Ti compounds.

The electrical steel sheet that serves as the base material of the laminated core may be manufactured with any method. By adjusting the controlling parameters of the manufacturing method, control can be made to achieve the ranges of the disclosed embodiments. A preferred method is a processing method that uses a shock wave that is generated by applying a laser beam to the portion being processed of the steel sheet, in water or in a state in which a water film is present on the surface of the steel sheet. The laser beam may be a nanosecond pulsed laser beam having a pulse width of nanoseconds, a microsecond pulsed laser beam having a pulse width of microseconds, or a continuous laser beam. In instances where conventional mechanical processing that uses a blade is employed, the resulting material has small scratches formed in a shear direction. This is because it is impossible to avoid the abrasion of the material (workpiece) caused by a flaw formed in or near an edge of the cutting blade or by molten metal or the like present at or near the edge of the blade. Accordingly, processing that is not mechanical and uses a shock wave as described above has, in principle, few factors that increase the roughness of the processed surface, and, therefore, the processing makes it possible to consistently produce a processed surface having a low roughness. Furthermore, in the case of the processing that uses a shock wave, it takes a very short time for the processing to complete, and, therefore, the zone affected by the compressive stress generated by the shock wave is very limited. As a result, the amount of the insulating coating that reaches the processed surface can be reduced. Note that even with different processing, such as punching or beveling, it is not impossible to control the roughness of the processed surface and the ratio of the insulating coating present thereon such that the roughness and the ratio fall within the range or a preferred range of the disclosed embodiments, provided that the processing conditions are controlled frequently and with high precision. Accordingly, the processing method is not limited to the above-described processing method that uses a shock wave. Note that the "nanosecond pulsed laser" is a laser having a pulse width of 1 nanosecond or more and less than 1000 nanoseconds, and the "microsecond pulsed laser" is a laser having a pulse width of 1 microsecond or more and less than 1000 microseconds.

An example of a method for manufacturing the laminated core of the disclosed embodiments is a method for manufacturing a laminated core including a step (processing step) and a lamination step. In the step (processing step), an electrical steel sheet that serves as the base material is processed into pieces having a predetermined shape. In the lamination step, the pieces of the electrical steel sheet (material of the core) having a predetermined shape resulting from the step are laminated, and portions of the processed surface are abutted against each other to form the laminated core. In the processing step, processing is performed on the electrical steel sheet that serves as the base material, such that the area ratio of regions of the processed surface that have an arithmetic mean roughness Ra of 5 $\mu$m or less becomes 90% or greater based on the total area of the processed surface. Furthermore, in the instance where the electrical steel sheet that serves as the base material includes an insulating coating on the surface, it is preferable that the processing in the processing step be performed on the electrical steel sheet that serves as the base material, such that the area ratio of portions of the insulating coating that are present on the processed surface becomes 30% or less based on the total area of the processed surface.

EXAMPLES

Example 1

A steel slab was manufactured by continuous casting. The steel slab had a chemical composition containing C: 0.01 mass %, Si: 2.2 mass %, Mn: 0.15 mass %, Ni: 0.1 mass %, Al: 60 mass-ppm, N: 40 mass-ppm, Se: 10 mass-ppm, and S: 5 mass-ppm, with the balance being Fe and incidental impurities. The steel slab was heated to 1200° C. Subsequently, the steel slab was subjected to hot rolling to form a hot rolled steel sheet having a thickness of 2.0 mm, and thereafter, the hot rolled steel sheet was subjected to hot band annealing at 1050° C. for 120 seconds. Subsequently, the resulting steel sheet was pickled with hydrochloric acid to remove subscale from the surface and thereafter subjected to cold rolling to form a cold rolled steel sheet having a thickness of 0.30 mm.

Subsequently, decarburization annealing was performed in which the steel sheet was held at a soaking temperature of 860° C. for 60 seconds with a degree of oxidation $PH_2O/PH_2$ of 0.40. Subsequently, an annealing separator containing MgO as a major component was applied, and final annealing for achieving secondary recrystallization, forming a forsterite coating, and achieving purification was performed under the conditions of 1150° C. and 20 hr. Thereafter, a coating liquid for forming an insulating tension coating was applied, and thereafter, the resultant was baked at 880° C., to form an insulating coating. The coating liquid was made of colloidal silica and aluminum phosphate and had a concentration of 60 mass %. The baking process doubled as flattening annealing.

Subsequently, a sample for evaluating the iron loss property of the base material was taken from the electrical steel sheet coil prepared as described above, and the sample was subjected to stress relief annealing at 800° C. for 3 hours. Subsequently, the iron loss property of the base material was evaluated in accordance with JIS C 2550. In parallel with the evaluation of the properties of the base material, processing was performed on the prepared coil to form pieces that conformed to the shape of a core for a transformer. Thereafter, the processed pieces of the electrical steel sheet (material of the core) having a predetermined shape were stacked, and the pieces of the material of the core were abutted against each other. In this manner, a 1500 KVA three-phase three-legged transformer core with a core weight of 1200 kg was produced. Primary and secondary windings were wound around the three legs. The transformer (laminated core) was then excited at 1.7 T and 50 Hz with a phase shift of 120° to measure the iron loss of the transformer.

The processing of the material of the core was performed in water with a laser. The laser used was a single-mode fiber laser that emitted a continuous wave, and the processing speed was 50 mpm. The laser output was varied over a range of 0.5 to 5.0 kW, and the beam diameter of the laser was varied over a range of 10 to 300 μm. As referred to herein, the beam diameter of the laser is a beam diameter of the laser on the surface of the workpiece, that is, the steel sheet. Specific laser outputs and processing speeds are shown in or less was within the range of the disclosed embodiments and in which the area ratio of the insulating coating present on the processed surface was within a preferred range of the disclosed embodiments. It can be seen, however, that in Nos. 5 and 7, the increase in iron loss was inhibited compared with samples in which the area ratio of regions of the processed surface that have an arithmetic mean roughness Ra of 5 μm or less was outside the range of the disclosed embodiments. As described, in the instance where an electrical steel sheet in which the area ratio of regions of the processed surface that have an arithmetic mean roughness Ra of 5 μm or less satisfies the range of the disclosed embodiments is used as a material of a core, a laminated core having a good iron loss property can be obtained.

TABLE 1

| No. | Laser output (KW) | Beam diameter of laser (μm) | Area ratio of regions of processed surface that have Ra of 5 μm or less (%) | Area ratio of insulating coating present on processed surface (%) | Iron loss of base material (W/kg) | Iron loss of laminated core (W/kg) | Ratio of increase in iron loss *1 | Notes |
|---|---|---|---|---|---|---|---|---|
| 1 | 0.5 | 10 | 100 | 5 | 1.1 | 1.30 | 1.18 | Example |
| 2 | 1.0 | 20 | 98 | 8 | 1.1 | 1.30 | 1.18 | Example |
| 3 | 1.5 | 20 | 97 | 8 | 1.1 | 1.29 | 1.17 | Example |
| 4 | 2.0 | 30 | 96 | 10 | 1.1 | 1.31 | 1.19 | Example |
| 5 | 2.0 | 300 | 96 | 70 | 1.1 | 1.48 | 1.35 | Example |
| 6 | 3.0 | 35 | 95 | 30 | 1.1 | 1.33 | 1.21 | Example |
| 7 | 3.0 | 200 | 95 | 50 | 1.1 | 1.44 | 1.31 | Example |
| 8 | 4.0 | 10 | <u>75</u> | 9 | 1.1 | 1.65 | 1.50 | Comparative Example |
| 9 | 4.0 | 100 | <u>70</u> | 10 | 1.1 | 1.70 | 1.55 | Comparative Example |
| 10 | 5.0 | 10 | <u>60</u> | 16 | 1.1 | 1.66 | 1.51 | Comparative Example |
| 11 | 5.0 | 80 | <u>60</u> | 35 | 1.1 | 1.72 | 1.56 | Comparative Example |

*1 Iron loss of laminated core (W/kg)/Iron loss of base material (W/kg)
The underline indicates that the value is outside the range of the disclosed embodiments.

Table 1. Regarding the processed material of the core (electrical steel sheet), the area ratio (%) of regions of the processed surface that have an arithmetic mean roughness Ra of 5 μm or less based on the total area of the processed surface and the area ratio (%) of the insulating coating present on the processed surface were evaluated in the manner described above.

The results are shown in Table 1. In Nos. 1, 2, 3, 4, and 6, the area ratio of regions of the processed surface that have an arithmetic mean roughness Ra of 5 μm or less satisfied the range of the disclosed embodiments, and in addition, the area ratio of the insulating coating present on the processed surface satisfied a preferred range of the disclosed embodiments. In Nos. 1, 2, 3, 4, and 6, it can be seen that an increase in iron loss resulting from the formation of the laminated core from the material of the core was inhibited. In Nos. 8, 9, 10, and 11, the area ratio of regions of the processed surface that have an arithmetic mean roughness Ra of 5 μm or less was outside the range of the disclosed embodiments, and as a result, the increase in iron loss resulting from the formation of the laminated core from the material of the core was very significant. In Nos. 5 and 7, the area ratio of the insulating coating present on the processed surface was outside a preferred range of the disclosed embodiments, whereas the area ratio of regions of the processed surface that have an arithmetic mean roughness Ra of 5 μm or less was within the range of the disclosed embodiments. In Nos. 5 and 7, the increase in iron loss was larger than that of samples in which the area ratio of regions of the processed surface that have an arithmetic mean roughness Ra of 5 μm Example 2

A steel slab containing Si: 3.1 mass %, Mn: 0.03 mass %, and Al: 0.3 mass % with the balance being Fe and incidental impurities was manufactured. The steel slab was subjected to hot rolling to form a hot rolled steel sheet of 1.8 mm. Subsequently, the hot rolled steel sheet was subjected to hot band annealing at 1000° C. for 60 seconds and thereafter to cold rolling to form a steel sheet having a thickness of 0.30 mm. Subsequently, the steel sheet was subjected to final annealing under the conditions of 1040° C., 10 seconds, $N_2:H_2=70:30$ (volume ratio), and a dew point of −50° C. Subsequently, a coating liquid for forming an insulating coating was applied to the surface of the steel sheet. The coating liquid contained a mixture of aluminum dichromate, an emulsion resin, and ethylene glycol. The resultant was then baked at 300° C. to form an insulating coating.

Epstein test specimens were cut from the electrical steel sheet coil prepared as described above. One half of the test specimens were cut in a rolling direction, and the other half were cut in a direction perpendicular to the rolling direction. An iron loss W10/400 of the base material was evaluated in accordance with a method specified in JIS C 2550-3. In parallel with the evaluation of the base material, processing was performed on the coil. The resulting pieces of the electrical steel sheet (material of the core) having a predetermined shape were stacked, and the pieces of the material of the core were abutted against each other to form a split stator. An integral rotor of a 3-phase 4-pole 24-slot distributed winding rare-earth IPM motor (rated power: 720 W) and the split stator were assembled into a motor.

The processing of the material of the core was processing that used a shock wave to provide pieces having a predetermined shape; the processing was laser processing performed in a state in which a water film 3 μm thick was present on the surface of the steel sheet. The laminated core (stator) was thereafter formed by rotationally stacking the pieces of the material of the core. A no-load loss of the produced motor was measured at a rotational speed of 3500 rpm with a motor characterization apparatus including a brake motor, a tachometer, a torque meter, a wattmeter, and the like.

The processing for forming the shape of the material of the core was carried out with a nanosecond pulsed laser at a processing speed of 100 mpm. The laser output was varied over a range of 3.0 to 8.0 kW, and the beam diameter of the laser was varied over a range of 10 to 300 μm. Specific laser outputs and processing speeds are shown in Table 2. Regarding the processed material of the core (electrical steel sheet), the area ratio (%) of regions of the processed surface that whereas the area ratio of regions of the processed surface that have an arithmetic mean roughness Ra of 5 μm or less was within the range of the disclosed embodiments. In Nos. 5 and 7, the increase in iron loss was larger than that of samples in which the area ratio of regions of the processed surface that have an arithmetic mean roughness Ra of 5 μm or less was within the range of the disclosed embodiments and in which the area ratio of the insulating coating present on the processed surface was within a preferred range of the disclosed embodiments. It can be seen, however, that in Nos. 5 and 7, the increase in iron loss was inhibited compared with samples in which the area ratio of regions of the processed surface that have an arithmetic mean roughness Ra of 5 μm or less was outside the range of the disclosed embodiments. As described, in the instance where an electrical steel sheet in which the area ratio of regions of the processed surface that have an arithmetic mean roughness Ra of 5 μm or less satisfies the range of the disclosed embodiments is used as a material of a core, a laminated core having a good iron loss property can be obtained.

TABLE 2

| No. | Laser output (KW) | Beam diameter of laser (μm) | Area ratio of regions of processed surface that have Ra of 5 μm or less (%) | Area ratio of insulating coating present on processed surface (%) | Iron loss of base material (W/kg) | No-load loss of laminated core (W) | Ratio of increase in iron loss *1 | Notes |
|---|---|---|---|---|---|---|---|---|
| 1 | 3.0 | 10 | 100 | 7 | 15 | 80 | 5.33 | Example |
| 2 | 3.5 | 20 | 98 | 10 | 15 | 80 | 5.33 | Example |
| 3 | 4.0 | 20 | 97 | 10 | 15 | 78 | 5.20 | Example |
| 4 | 4.5 | 30 | 96 | 12 | 15 | 82 | 5.47 | Example |
| 5 | 5.0 | 300 | 96 | 68 | 15 | 100 | 6.67 | Example |
| 6 | 6.0 | 35 | 95 | 28 | 15 | 82 | 5.47 | Example |
| 7 | 6.5 | 200 | 95 | 52 | 15 | 98 | 6.53 | Example |
| 8 | 7.0 | 10 | <u>75</u> | 12 | 15 | 135 | 9.00 | Comparative Example |
| 9 | 7.5 | 100 | <u>70</u> | 11 | 15 | 133 | 8.87 | Comparative Example |
| 10 | 8.0 | 10 | <u>60</u> | 18 | 15 | 138 | 9.20 | Comparative Example |
| 11 | 8.0 | 80 | <u>60</u> | 32 | 15 | 136 | 9.07 | Comparative Example |

*1 No-load loss of laminated core (W)/Iron loss of base material (W/kg)

The underline indicates that the value is outside the range of the disclosed embodiments.

have an arithmetic mean roughness Ra of 5 μm or less based on the total area of the processed surface and the area ratio (%) of the insulating coating present on the processed surface were evaluated in the manner described above.

The results are shown in Table 2. In Nos. 1, 2, 3, 4, and 6, the area ratio of regions of the processed surface that have an arithmetic mean roughness Ra of 5 μm or less satisfied the range of the disclosed embodiments, and in addition, the area ratio of the insulating coating present on the processed surface satisfied a preferred range of the disclosed embodiments. In Nos. 1, 2, 3, 4, and 6, it can be seen that an increase in iron loss resulting from the formation of the laminated core from the material of the core was inhibited. In Nos. 8, 9, 10, and 11, the area ratio of regions of the processed surface that have an arithmetic mean roughness Ra of 5 μm or less was outside the range of the disclosed embodiments, and as a result, the increase in iron loss resulting from the formation of the laminated core from the material of the core was very significant. In Nos. 5 and 7, the area ratio of the insulating coating present on the processed surface was outside a preferred range of the disclosed embodiments,

The invention claimed is:

1. A laminated core comprising:

a stack of pieces of an electrical steel sheet that have a predetermined shape resulting from processing; and a butted portion at which portions of a processed surface of the electrical steel sheet are abutted against each other, wherein in the electrical steel sheet, an area ratio of regions of the processed surface that have an arithmetic mean roughness Ra of 5 μm or less is 90% or greater based on a total area of the processed surface, the electrical steel sheet includes a steel sheet and an insulating coating on a surface of the steel sheet, and an area ratio of portions of the insulating coating that are present on the processed surface is 30% or less based on the total area of the processed surface, the area ratio of the portions of the insulating coating being the percentage of the processed surface that has the insulating coating.

* * * * *